United States Patent [19]
Guichard et al.

[11] Patent Number: 5,365,270
[45] Date of Patent: Nov. 15, 1994

[54] METHOD AND DEVICE FOR THROUGHPUT COMPRESSION FOR A VIDEOPHONE CAMERA

[75] Inventors: Jacques Guichard; Georges Buchner, both of Paris; Jean-Yves Eouzan, Cesson Sevigne; Jean-Claude Hertaux, Liffre, all of France

[73] Assignees: Thomson-CFS, Puteaux; Etat Francais represented by Le Centre National d'Etudes des Telecommunications, Issy Les Moulineaux, both of France

[21] Appl. No.: 859,465
[22] PCT Filed: Nov. 27, 1990
[86] PCT No.: PCT/FR90/00852
  § 371 Date: Jun. 1, 1992
  § 102(e) Date: Jun. 1, 1992
[87] PCT Pub. No.: WO91/08643
  PCT Pub. Date: Jun. 13, 1991

[30] Foreign Application Priority Data
Dec. 1, 1989 [FR] France .................. 89 15887

[51] Int. Cl.⁵ .............................................. H04N 3/14
[52] U.S. Cl. ....................................... 348/311; 348/312
[58] Field of Search ................. 358/213.26, 213.22, 358/213.23, 213.31, 213.11, 137, 138, 213.24, 213.19; 348/311, 312

[56] References Cited

U.S. PATENT DOCUMENTS

| 4,339,775 | 7/1982 | Lemke et al. | 358/213.31 |
| 4,706,123 | 11/1987 | Chautemps | 358/213.19 |
| 4,831,453 | 7/1989 | Takemura | 358/213.22 |
| 4,876,703 | 10/1989 | Urata et al. | 358/213.31 |

Primary Examiner—Joseph Mancuso
Assistant Examiner—Wendy R. Greening
Attorney, Agent, or Firm—Oblon, Spivak, McClelland, Maier & Neustadt

[57] ABSTRACT

A method and apparatus for throughput compression for use in a videophone camera wherein an array of photosensitive cells is divided into odd and even lines and the cells of these cells are interlaced with each other and then the interlaced lines are coupled together such that during a first time interval the electric charges stored in the cells of the even lines are transferred to a plurality of first storage cells, then transferred to a plurality of corresponding second storage cells during a succeeding time interval and finally added in the second storage cells to the electrical charges in the corresponding cells of the odd lines of the cell array during a third time interval.

9 Claims, 2 Drawing Sheets

METHOD AND DEVICE FOR THROUGHPUT COMPRESSION FOR A VIDEOPHONE CAMERA

BACKGROUND OF THE INVENTION

1. Field of the Invention

The present invention relates to a method and a device for throughput compression for a videophone camera provided with a charge-transfer photosensitive array. It also relates to a corresponding image transmission system.

2. Discussion of the Background

In order to reduce the throughput of information transmitted by the cameras of moving-picture transmission systems, it is known to store the images in buffer memories, thus making it possible to dispense with the interlacing of lines so as to retain on transmission only one image out of two, or to reduce the number of images transmitted per second in the ratios ¼ or 1/6, or else to code the images to be transmitted with codes of diverse types, with variable lengths for example. However, these techniques lead to expensive embodiments which cannot easily be carried over to videophone cameras whose cost price must reflect the average quality demanded of this type of equipment.

SUMMARY OF THE INVENTION

The aim of the invention is to alleviate the abovementioned disadvantages.

To this effect, the subject of the invention is a method of throughput compression for a videophone camera comprising an array of charge-transfer photosensitive cells as an image sensor, characterized in that it consists:

in dividing up the array of photosensitive cells into two frames of interlaced even and odd lines of cells in transferring during a first time interval $T_1$ the electric charges supplied by each cell of an even line into the first storage cells respectively in transferring during a second time interval $T_2$ following the first interval $T_1$ the electric charges contained in the first storage cells $M_1$ into second storage cells respectively in adding respectively during a third time interval $T_3$ the electric charges stored in the second cells to the electric charges supplied by each counterpart cell of an odd line and in continuously adjusting as a function of each desired throughput of the camera the duty cycles of the intervals $T_1$, $T_2$ and $T_3$ relative to the scan period for the lines of the array of photosensitive cells in the inverse ratio of the timing speeds.

The subject of the invention is also a device for implementing the abovementioned method and an application of the method and of the device to the production of a system for image transmission by videophone.

The invention has the advantage of being applicable equally well to structured arrays in order to effect interline transfers as to structured arrays in order to effect interframe transfers.

It also has the other advantages of making it possible to effect a spatial filtering on the points of the image by pairwise compounding of the information contained in the lines of the charge-transfer photosensitive array and a time filtering by reducing the number of images analyzed per unit time, making it possible, for example, to go from images containing 50 frames per second under the CCIR standard to images scrolling at rates of 50; 25; 16.7; 12.5; 10 or 8.3 images per second for example. It also makes it possible to effect a space time filtering on objects or persons in motion, because the sampling effected on the points of the charge-transfer photosensitive array can be effected at a slow rate, thus making it possible to better reveal the low-frequency components of the motion. Moreover, the reduction in the timing of the control signals applied to the charge-transfer photosensitive array has the effect of increasing the integration time of the charge-transfer cells and of increasing the amplitude of the signal supplied by each cell of the array, this increasing the sensitivity of cameras equipped with the photosensitive arrays according to the invention.

BRIEF DESCRIPTION OF THE DRAWINGS

Other characteristics and advantages of the invention will emerge below with the aid of the description which follows, made in connection with the attached drawings wherein:

FIG. 6 shows an overall diagram of a videophone according to the invention.

Figure 1:
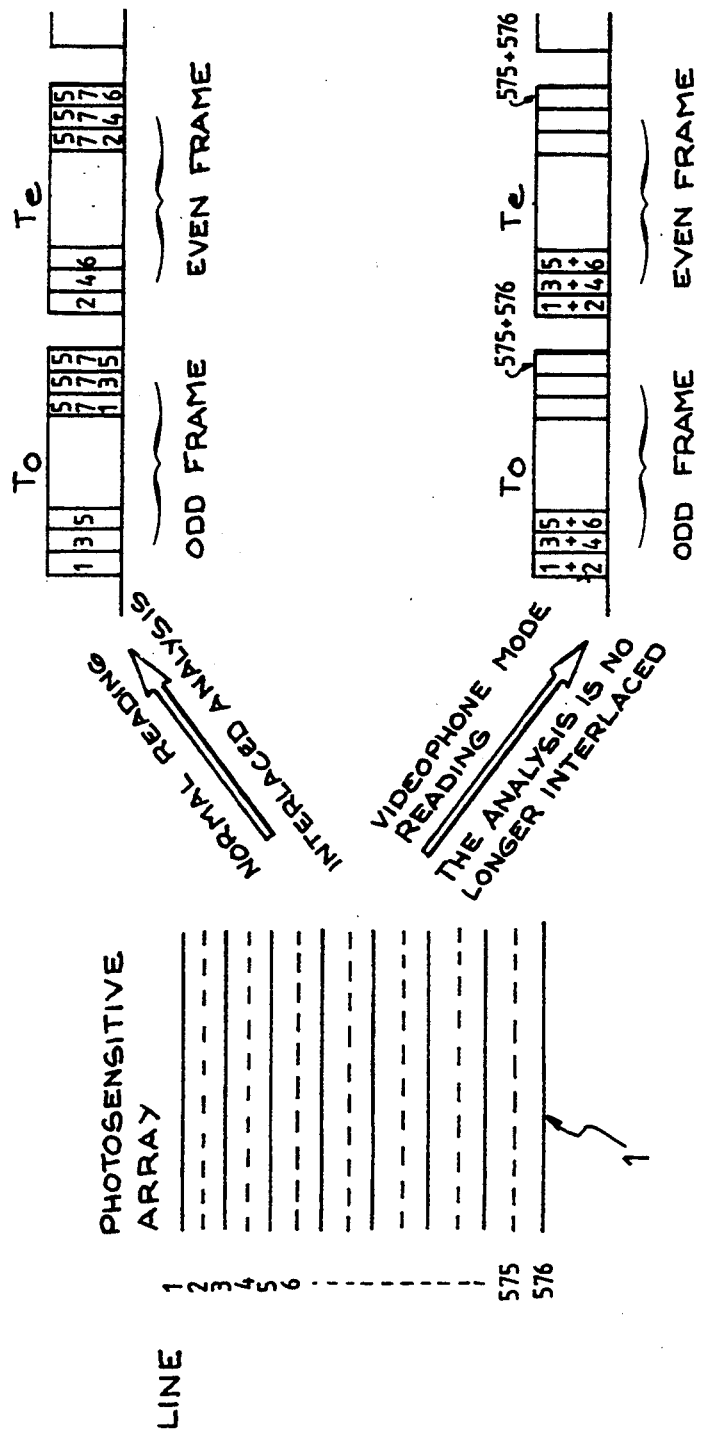
FIG. 1 shows an illustration of the method according to the invention.

The method according to the invention, which is illustrated by the basic diagram of FIG. 1, consists in dividing up the array of photosensitive cells forming the sensor of the camera into two frames of interlaced cells, in order to bring about a compression of the image by coupling to one another the counterpart lines of each frame. Thus, in FIG. 1, the array of photosensitive cells 1, which is formed in this example of 576 lines, includes a first frame consisting of odd lines numbered from 1 to 575 and of even lines numbered from 2 to 576. The counterpart lines in the two frames thus form an ordered sequence "S"=(1,2); (3,4); (5,6) . . . (575,576) of pairs of lines. The compression of the image is next produced by compounding the luminance values supplied by the counterpart photosensitive cells in each pair of lines. The results obtained from the compoundings are later coded in any appropriate known form in order to permit their transmission to videophone receivers.

Figure 2:
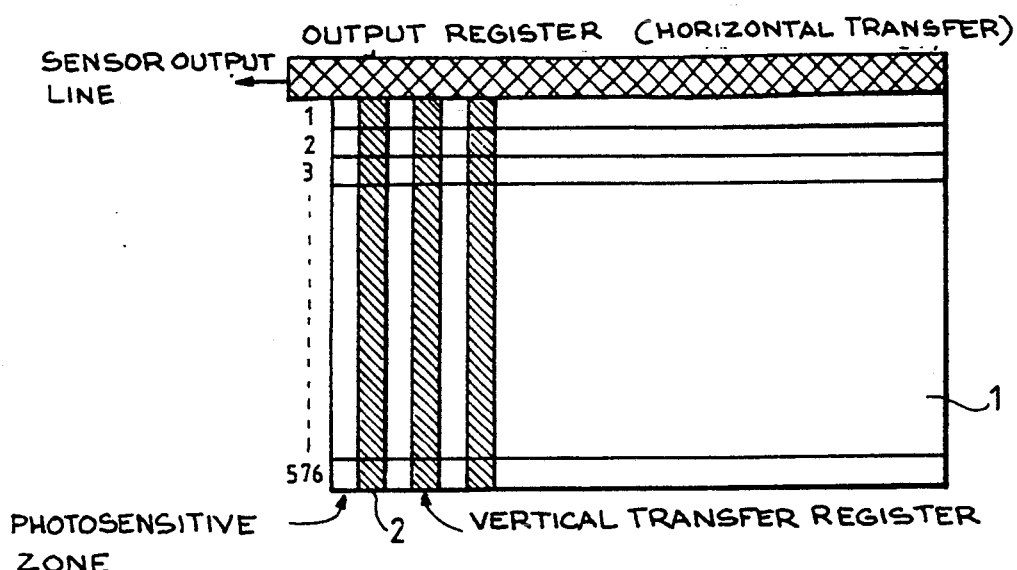
FIG. 2 shows an array of charge-transfer photosensitive cells for a videophone camera according to the invention.
Figure 3:
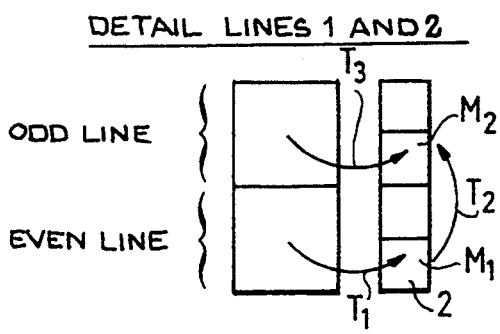
FIGS. 3 and 4 show two diagrams to illustrate an implementation of the method according to the invention.
Figure 4:
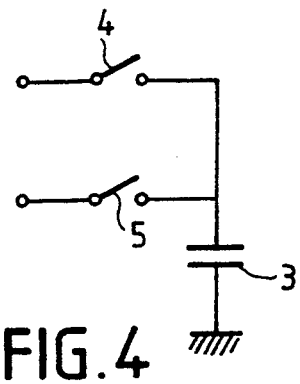

In this way, the photosensitive cells supply two image frames, even $T_e$ and odd $T_o$, which are identical when they are read by the scan generator of the camera, contrary to what is obtained when the two frames are read successively without any coupling between counterpart lines of the two frames. An array of charge-transfer photosensitive cells 1 enabling this result to be obtained is represented in FIG. 2. It is organized as an "Interline Transfer" structure and comprises, arranged between the consecutive columns of photosensitive cells of the array, a register 2 of charge-transfer storage cells. Each cell of the register 2 makes it possible, in the manner represented in FIGS. 3 and 4, to compound the electric charges supplied by two counterpart photosensitive cells in each of the frames of cells. The operation is performed during three successive instants, labelled $T_1$, T2 and T3 in FIG. 3. During the instant T1 the electric charge supplied by each cell of an even line is transferred into a storage cell M1 of the register 2. During the instant T2 the electric charge stored in cell M1 is transferred to a storage cell M2 of the register 2. During the instant T3, the electric charge stored in a storage cell M2 is added to the electric charge coming from the counterpart photosensitive cell in the other frame. However, it should be noted that this embodiment is not unique and that other variants may exist consisting in particular, as FIG. 4 shows, in injecting the two electric charges coming from each pair of photosensitive cells into a capacitor 3 linked to the cells across two switching devices 4 and 5 which are formed, for example, by MOS transistors in the event that an array with "Frame Transfer" structure is used in which the charge-transfer registers consist of the columns of photosensitive cells themselves.

All the characteristic instants required for the functioning of the system according to the invention are obtained by means of a sequencer of synchronizing signals (not shown), one possible embodiment of which may be found for example in French Patent Application FR 2 596 600 filed in the name of the Company THOMSON-CSF, entitled "Programmable generator of synchronizing signals".

To enable a possible time filtering to be effected, the signals will have to have variable durations while having constant duty cycles and relative phases.

Figures 5A, 5B:
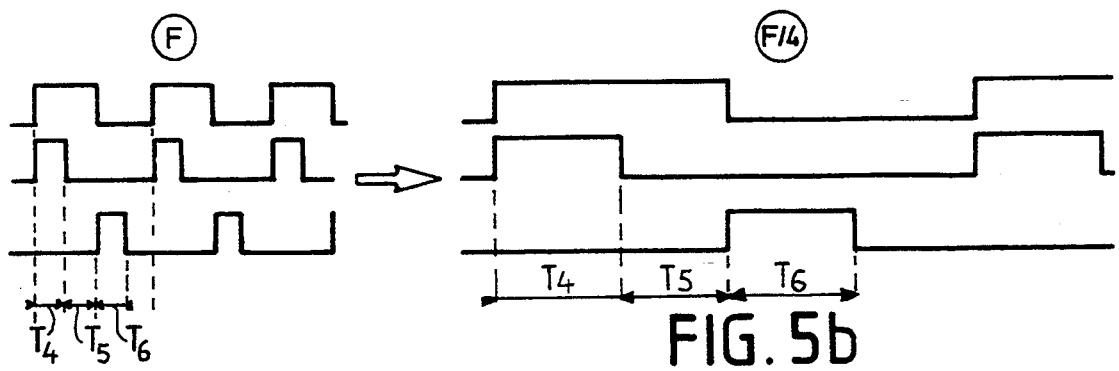
FIGS. 5a and 5b show two timing diagrams corresponding to the functioning of the devices of FIGS. 2 and 3.

As represented in FIGS. 5a and 5b for an arbitrary signal at the characteristic instants $T_4$, $T_5$, $T_6$, etc., the sequencer then has to be programmed in order, on the basis of a variable-frequency clock, to supply the signals required for control of the array of photosensitive cells and of the processing chain of the camera (not shown) which is associated with it. With this aim, the characteristic instants of the control signals should remain perfectly homothetic in order to ensure, throughout the relevant frequency range, transfers of charge in the vertical and horizontal directions of the array and permit the processing of the signals supplied by the charge-transfer matrix in the camera, such as the operations of sampling, of separation of the luminance and chrominance signals, the restoring of the continuous component, and the operations of suppression and synchronization.

For example, instead of entering the luminance information at the rate of 625 lines per second in accordance with the CCIR standard into memories arranged in the low-throughput coder and extracting therefrom, by sampling, only one out of a specified number n in accordance with the line throughput and the quantity of information to be processed, the use of a variable-frequency clock to drive the sequencer makes it possible to choose a rate of analysis of the photosensitive device which can be adjusted continuously, for example between 50 images per second and 8.3 images per second, and simplifies the conversion and read-back stages of the coding circuits of the camera. However, it should be observed that by proceeding in this manner a "blurring" effect inevitably occurs as regards persons or objects moving in the field of the camera during the integration time of the charge-transfer cells which is all the larger the smaller the rate of analysis of the image. This "blurring", also sometimes called streaking, may advantageously be profited from in order on the one hand to simplify the embodiment of the low-throughput coders of the cameras which thus have less information to transmit because the spatial resolution as regards objects in motion is diminished and on the other hand, in order to also simplify the embodiment of the motion detectors, required in coding when the instantaneous throughput of the information to be processed is too large, because the low-frequency spatial components of the motion then predominate.

By contrast with known low-throughput analysis systems in which the reduction in timing is done by periodic extraction of images (1 out of 2, or 3 or n . . . ) which are analyzed with a constant integration time of 20 ms, the method and device according to the invention make it possible to effect these same analyses at the same rates but with an integration time which is prolonged in the inverse ratios of speed of the timings, that is to say 2, 3 or n . . . , for respective timing reductions of $\frac{1}{2}$, $\frac{1}{3}$ or $\frac{1}{n}$. As the amplitude of the signal delivered by each photosensitive cell is proportional to the integration time, the amplitude of the signal delivered is also multiplied as the ratio of growth in integration time when the rate diminishes, naturally regarding the luminance of the scene observed by the camera and the relative aperture of its optical system as constants. This furthermore offers another advantage which is to permit the easy realization of low-pass filtering of the low-throughput output of cameras provided with the photosensitive cell arrays of the invention, whilst endowing the corresponding digital filter with a cutoff frequency which also varies in the ratios $\frac{1}{2}$, $\frac{1}{3}$ . . . $1/n$ of the timings, since, for these filters, the cutoff frequency is equal to half the sampling frequency. On the other hand, as the black level voltage delivered by each photosensitive cell is also increased in the ratios 2, 3 . . . and n whereas the effective noise voltage associated with it increases only in the ratios $\frac{1}{2}$, $\frac{1}{3}$ and $1/n$, the signal-to-noise ratio increases at the same time as the analysis rate diminishes. The method thus makes it possible to obtain, for example, by comparison with the prior methods, an improvement in the signal-to-noise ratio of 10 dB for an image timing of 8.3 Hz, viz an improvement in sensitivity by a factor 3, this being very large for digital coding-decoding systems (CODEC) the performance of which is conditioned by the signal-to-noise ratio of the input signal.

An image transmission system able to implement the method and the device according to the invention is represented in FIG. 6. It includes in known manner an image sensor 6, a coder 7, a transmission channel or line 8, a decoder 9 and a viewing screen 10.

What is claimed is:

1. A method of throughput compression for use in a videophone camera comprising an array of charge-transfer photosensitive cells forming an image sensor, said method comprising the steps of:

dividing up the array of photosensitive cells into two frames of interlaced even and odd lines of the cells;

transferring, during a first time interval, electric charges supplied by each cell of an even line into a plurality of corresponding first storage cells;

transferring, during a second time interval following the first interval, the electric charges contained in the first storage cells into a plurality of corresponding second storage cells;

adding, during a third time interval, the electric charges stored in said plurality of second cells to electric charges supplied by each of a plurality of corresponding cells of a corresponding odd line of cells; and continuously adjusting, as a function of each desired throughput of the videophone camera, duty cycles of the first, second and third time intervals relative to a period for scanning the lines of the array of photosensitive cells, wherein said duty cycles are adjusted in proportion to the inverse ratio of the speed of scanning the lines of the array.

2. The method according to claim 1, wherein said method further comprises the step of compounding, for each pair of cells, luminance values supplied by each cell prior to transmission of said luminance values.

3. The method according to claim 2, wherein said step of compounding said luminance values supplied by each pair of cells takes place by transferring the electric charges emitted by each cell into said second storage cells, which charge is common to each pair of corresponding cells, or into registers consisting of columns of photosensitive cells.

4. The method according to either one of claims 1 and 3, wherein the transfer of charges emitted by each cell is timed by means of a variable-frequency generator.

5. A device for implementing the method according to claim 1 wherein each array of photosensitive cells comprises a register of charge-transfer storage cells arranged between consecutive columns of the array.

6. A device according to claim 5, wherein each array of photosensitive cells comprises a plurality of columns acting both as photosensitive cells and as charge-transfer registers.

7. A device according to claim 6, wherein each storage cell of said charge-transfer registers is coupled to a photosensitive cell of the array by means of a switching device.

8. A device according to claim 7, wherein each switching device comprises a MOS transistor.

9. An image transmission system comprising:
an image sensor coupled to a viewing screen across a transmission channel, wherein said image sensor comprises an array of comprising a plurality of registers of charge-transfer storage cells for compounding the electric charges supplied by the photosensitive cells of each pair of cells and coding the resulting electrical magnitudes before transmission of said electrical magnitudes on the transmission channel with a variable timing for reducing the throughput of the information to be coded, improving the sensitivity of the system and simplifying the coding-decoding method.

* * * * *

UNITED STATES PATENT AND TRADEMARK OFFICE
CERTIFICATE OF CORRECTION

PATENT NO. : 5,365,270
DATED : November 15, 1994
INVENTOR(S) : Jacques GUICHARD, et al.

It is certified that error appears in the above-indentified patent and that said Letters Patent is hereby corrected as shown below:

On the title page, Item [73], the first Assignee should read:

--Thomson-CSF--

Signed and Sealed this

Twenty-first Day of March, 1995

Attest:

BRUCE LEHMAN

Attesting Officer  Commissioner of Patents and Trademarks